March 11, 1952 — J. N. DEUEL — 2,588,494

COOKING UTENSIL

Filed April 23, 1949

INVENTOR.
Jack N. Deuel
BY
Robt. W. Pearson
ATTORNEY.

Patented Mar. 11, 1952

2,588,494

UNITED STATES PATENT OFFICE 2,588,494

COOKING UTENSIL

Jack N. Deuel, Hawthorne, Calif.

Application April 23, 1949, Serial No. 89,179

1 Claim. (Cl. 126—275)

This invention relates to a cooking utensil of the type having an open bottom.

More specifically speaking the invention pertains to a cooking utensil having an open bottom surrounded by a side wall and a cover atop said wall, said cover being manually movable to an open position to admit raw edibles which are placed upon a stove griddle underlying the utensil, the cover then being closed while such edibles are being cooked, and opened again to permit their removal after cooking.

An object of the invention is to improve upon a utensil of this type by simplifying its construction and lowering the cost of manufacture.

Another object is to provide an open-bottomed cooking utensil having an improved cover structure which is heat-insulated in such a manner as to safeguard the cook from burning the fingers when opening or closing said cover.

Another object is to provide, for the utensil, an improved controllable air venting means.

A more specific object is to provide an improved means for incorporating a sheet of asbestos into the cover of a cooking utensil in such a manner as to safeguard the asbestos against becoming broken or cracked by repeated opening and closing of the cover structure of which it forms a part.

Other objects, advantages and features of invention will hereinafter appear.

Referring to the accompanying drawing, which illustrates a preferred embodiment of the invention, Fig. 1 is a vertical midsection of the cooker, the plane of section being indicated by line 1—1 on Fig. 2, a fragment of a stove griddle upon which the cooking utensil is mounted being included in the view. The cover is shown in full lines in its closed position and partly open in dotted lines.

Figure 1:
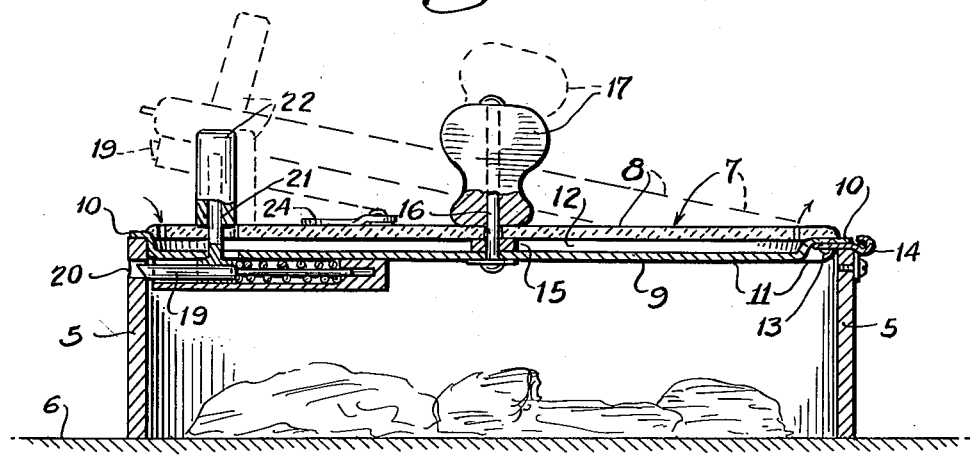
Figure 2:
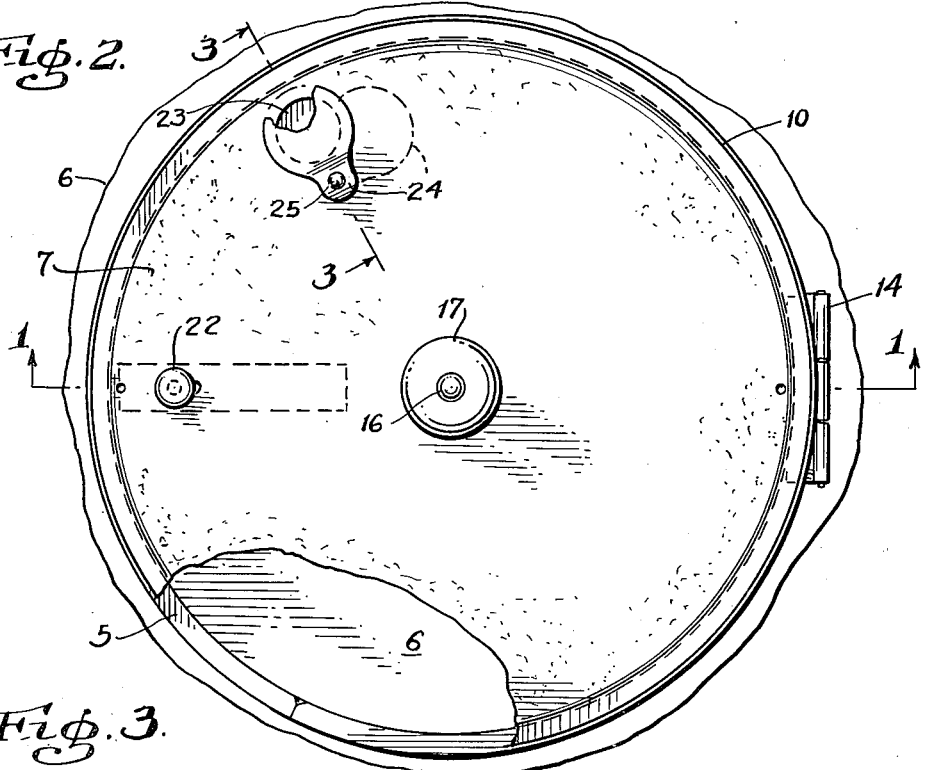
Fig. 2 is a top plan view of the structure shown in Fig. 1, parts being broken away in order more clearly to show underlying structure.
Figure 3:
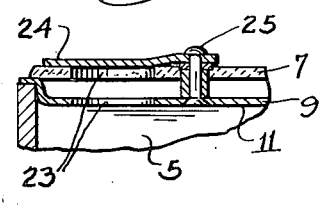
Fig. 3 is a fragmental section on line 3—3 of Fig. 2.

Referring in detail to the drawing, the cooking utensil shown comprises a circular side wall 5 which is open across the entire diameter of its lower end and is shown resting upon a stove griddle 6. The otherwise open top of said side wall is normally closed by a cover structure 7 which comprises an upper, asbestos disk or plate 8 and a lower, preferably metal disk or plate 9. Said lower disk or plate 9 has a peripheral portion 10 contoured and dimensioned to rest closely upon the top of the wall 5 when the cover is closed. The sheet metal is shown having an annular downward step 11 which is provided in order downwardly to offset the entire area of that portion of the plate 9 which is surrounded by its said peripheral part 10. The plate 9 is thus dished so that it combines with the overlying asbestos plate 8 to provide an air space 12 of value as a heat conserver. The peripheral portions of the two plates are desirably secured together by suitable fasteners 13, one of said fasteners being shown as assisting in securing to the cover a hinge structure 14 whereby the cover is hinged at one side to the top portion of the wall 5. Said hinge structure comprises two pivotally connected wings one of which is secured flatwise to the lower face of the peripheral portion of the dished plate 9.

In the central part of the cover structure a small spacer 15 is shown which safeguards the asbestos plate 8 from breaking down. A double headed pin 16 passes through the cover structure at this point and serves, not only to hold said spacer in place, but also to attach a handle 17.

Diametrically opposite to the hinge 14 the cover is shown provided with a spring-pressed latch bar 19 which cooperates with a locking hole or recess 20 in the wall 5. Said latch bar carries an operating stem 21 which projects upwardly through suitable clearances provided in the cover structure and has an operating handle 22 secured to its projecting portion.

It is desirable to provide the device with an adjustable steam vent to control the moisture and heat content of the chamber underlying the cover structure, when cooking eggs, waffles or the like. For this purpose the cover structure is shown having through it an aperture 23 and a small shutter 24 is shown pivoted at 25 adjacent to said aperture, said shutter being manually adjustable to control the size of said opening.

It will be seen that the cylindrical side wall 5 of the utensil extends vertically when the utensil is in its operative position and that the periphery of the cover structure extends radially outward to the top of said wall, thus producing as spacious a cooking chamber as possible. The part designated 6 may either be a stove top or a flat griddle of sufficient area to support the utensil.

The operation of the device will be readily understood from the foregoing description thereof.

It will be seen that by this invention, a lid structure is provided which enables the manufacturer to cut out, from asbestos sheet material now on the market, the heat insulating disk 8 which forms the upper part of the cover structure 7, said asbestos disk not requiring any flexing, or shaping other than being given a circular contour.

In using the device it may be placed on the top of a horizontal heated surface and a layer of batter then filled into its lower portion, and after the batter has been cooked into a circular pancake the utensil can be lifted away from the cooked pancake, which the cook will remove with a spatula. Or a layer of greasy ground meat may likewise be filled into the utensil and after cooking be handled in the same manner as the pancake.

I claim:

In a cover for a cooking utensil, a circular lower plate of substantially rigid sheet material, said plate having a peripheral portion to rest on the top of the side wall of a circular cooking utensil, said plate having a downwardly offset body portion extending to said peripheral portion and surrounded thereby, a flat circular asbestos plate having a peripheral portion resting flatwise upon and attached to said peripheral portion of said lower plate, spacing means located centrally of the cover between said two plates, a handle for said cover upstanding therefrom, a pin passing through said handle and spacing means keeping the latter in place to safeguard against breaking down of said asbestos plate, said handle being attached to the upper end portion of said pin and being thus held in contact with the upper surface of the central part of said asbestos plate, means carried by the lower end portion of said pin in an underlying abutting relation to the lower face of said lower plate so that said spacing means is gripped between said two plates and said asbestos plate is gripped between said handle and spacing means, a hinge attaching said cover to a cooking utensil, said hinge comprising two pivoted together wings one of which abuts flatwise against and is secured to the lower face of the aforesaid peripheral portion of said rigid plate, the other wing of said hinge being fastened to said cooking utensil.

JACK N. DEUEL.

REFERENCES CITED

The following references are of record in the file of this patent:

UNITED STATES PATENTS

| Number | Name | Date |
| --- | --- | --- |
| Re. 12,452 | Ferry | Feb. 13, 1906 |
| 401,723 | Stubbers | Apr. 16, 1889 |
| 587,528 | Inman | Aug. 3, 1897 |
| 589,090 | Kinsey | Aug. 31, 1897 |
| 626,808 | Gurney | June 13, 1899 |
| 1,205,919 | Minar | Nov. 21, 1916 |
| 1,611,087 | Sussman | Dec. 14, 1926 |
| 2,007,154 | Bowes | July 9, 1935 |